US011891819B2

(12) United States Patent
Eddy

(10) Patent No.: US 11,891,819 B2
(45) Date of Patent: Feb. 6, 2024

(54) PORTABLE SUPPORT PLATFORM

(71) Applicant: Brandon Eddy, Savage, MN (US)

(72) Inventor: Brandon Eddy, Savage, MN (US)

(73) Assignee: Brandon Eddy, Savage, MN (US)

( * ) Notice: Subject to any disclaimer, the term of this patent is extended or adjusted under 35 U.S.C. 154(b) by 0 days.

(21) Appl. No.: 17/070,656

(22) Filed: Oct. 14, 2020

(65) Prior Publication Data

US 2021/0108423 A1 Apr. 15, 2021

Related U.S. Application Data

(60) Provisional application No. 62/915,217, filed on Oct. 15, 2019.

(51) Int. Cl.
*E04F 15/16* (2006.01)
*A47G 27/02* (2006.01)
*E04F 15/02* (2006.01)
*E05B 5/00* (2006.01)
*E04B 5/00* (2006.01)

(52) U.S. Cl.
CPC ........ *E04F 15/166* (2013.01); *A47G 27/0218* (2013.01); *E04F 15/02* (2013.01); *E04B 5/00* (2013.01); *E05B 5/00* (2013.01)

(58) Field of Classification Search
CPC .......... E04F 15/166; E04F 15/02; E04B 5/00; A47G 27/0218
See application file for complete search history.

(56) References Cited

U.S. PATENT DOCUMENTS

| | | | | | |
|---|---|---|---|---|---|
| 1,166,050 | A * | 12/1915 | Johnson | E02B 3/127 | 405/19 |
| 2,551,976 | A * | 5/1951 | Smith | A47C 19/027 | 5/236.1 |
| 4,312,601 | A * | 1/1982 | Allen | E01C 9/08 | 405/15 |
| 4,566,821 | A * | 1/1986 | Knight | E01C 9/08 | 405/15 |
| 4,568,587 | A * | 2/1986 | Balzer | E04F 19/10 | 52/177 |
| 4,707,960 | A * | 11/1987 | Bullock | E04D 13/16 | 52/404.3 |

(Continued)

OTHER PUBLICATIONS

“Roll-Up Dish Drying Racks”, Kraus, [Online] Retrieved from the Internet: <URL: https://web.archive.org/web/20200418081845/https://www.kraususa.com/kitchen/kitchen-accessories/roll-up-dish-drying-racks.html>, (captured Apr. 18, 2020), 3 pgs.

(Continued)

*Primary Examiner* — Brian E Glessner
*Assistant Examiner* — Adam G Barlow
(74) *Attorney, Agent, or Firm* — SCHWEGMAN LUNDBERG & WOESSNER, P.A.

(57) ABSTRACT

A portable support platform may include a plurality of elongate segments arranged substantially parallel and adjacent to one another. The segments may be configured for spanning a space between two support points to support a user. The platform may also include a tying portion configured for flexibly securing the plurality of segments together. The platform may be arranged in a substantially flat open position for supporting a user and a substantially rolled up closed position for convenient transport and storage.

8 Claims, 8 Drawing Sheets

(56) References Cited

U.S. PATENT DOCUMENTS

| | | | | |
|---|---|---|---|---|
| 6,349,518 | B1 * | 2/2002 | Chacko | E04D 13/1612<br>52/404.3 |
| D485,373 | S * | 1/2004 | Morton | B29C 48/12<br>D25/138 |
| 6,874,972 | B2 * | 4/2005 | Davis | E01C 9/086<br>238/14 |
| D539,933 | S * | 4/2007 | Fischer | D25/125 |
| 8,161,690 | B1 * | 4/2012 | Borne | E04B 5/12<br>52/480 |
| 8,733,059 | B1 * | 5/2014 | Hamra | E04B 5/12<br>52/749.1 |
| 9,556,611 | B1 * | 1/2017 | Huckey | E04B 5/02 |
| 9,957,715 | B1 * | 5/2018 | Carlson | E04C 2/296 |
| 9,963,890 | B1 * | 5/2018 | Allen | E04G 5/045 |
| 10,125,504 | B1 * | 11/2018 | Allen | E04G 5/001 |
| 11,047,137 | B1 * | 6/2021 | Roche | E04F 15/02022 |

OTHER PUBLICATIONS

"RV Parts Country: Comco Table Roll Up Table with Carrying Bag—Aluminum", https://www.rvpartscountry.com/Camco-Table-Roll-Up-Table-With-Carrying-Bag-Aluminum_p_29324.html.

* cited by examiner

PORTABLE SUPPORT PLATFORM

CROSS-REFERENCE TO RELATED APPLICATION

This patent application claims the benefit of U.S. Provisional Patent Application No. 62/915,217, filed Oct. 15, 2019, entitled "PORTABLE SUPPORT PLATFORM", which is incorporated by reference herein in its entirety.

TECHNICAL FIELD

Examples described herein pertain generally to devices and tools used in the construction and maintenance of various buildings, and more particularly, to mats, cushions, pads, or other devices used for kneeling during building maintenance or construction. More particularly, the present disclosure relates to a portable support platform adapted for spanning between separated supports. Still more particularly, the present disclosure relates to a portable support platform adapted for resting on and spanning between bottom chords of trusses in an attic, for example, and a method of using the pad.

BACKGROUND

In residential homes, commercial structures, or other buildings or facilities, the roof, floor, or other generally horizontally spanning elements are often supported by an arrangement of spaced apart and parallel extending joists, trusses, beams, or other structural elements. In particular circumstances, there may not be a structural floor deck or platform covering or spanning across these structural elements. That is, during construction before the structural floor decks are installed and/or in an attic space where the ceiling structure below the trusses is only capable of supporting limited loading, users, workers, and other occupants may need to rely on support directly from the structural elements. This can create unsteady situations wear full foot support is not available on the structural elements. In many circumstances, it can create uncomfortable conditions wear a worker kneels on the relatively narrow structural elements. In any case, the situations can be challenging to work in, create risk and discomfort, and can adversely affect work productivity.

SUMMARY

In one or more embodiments, a portable support platform may include a plurality of elongate segments arranged substantially parallel and adjacent to one another. The segments may be configured for spanning a space between two support points to support a user. The platform may also include a tying portion configured for flexibly securing the plurality of segments together. The platform may be arranged in a substantially flat open position for supporting a user and a substantially rolled up closed position for convenient transport and storage.

In one or more embodiments, a method for using a portable support platform may include unrolling a portable support platform and placing the portable support platform on a top surface of at least two bottom chords of structural trusses. The method may also include bearing weight on the portable support platform to perform services in the space surrounding the platform.

DETAILED DESCRIPTION

The following description and the drawings sufficiently illustrate specific embodiments to enable those skilled in the art to practice them. Other embodiments may incorporate structural, logical, process, and other changes. Portions and features of some embodiments may be included in, or substituted for, those of other embodiments.

The present application, in one or more embodiments, relates to a portable support platform for use in unfinished spaces or spaces without structural floor decks. For example, during construction and/or in completed attic spaces, a structural floor deck may not be present and support of users, workers, or other occupants may be provided by spaced apart parallel extending structural members. The portable support platform may be carried to these locations in a collapsed condition for ease of carrying and transport and may be expanded or opened upon arriving at a use location. The portable support platform may be opened and/or expanded and placed to span across a gap or space between the spaced apart parallel extending structural members. The portable support platform may provide a larger working surface to support a user, worker or other occupant and may provide a safer and more comfortable work environment allowing more efficient work to be performed.

Figure 1A:
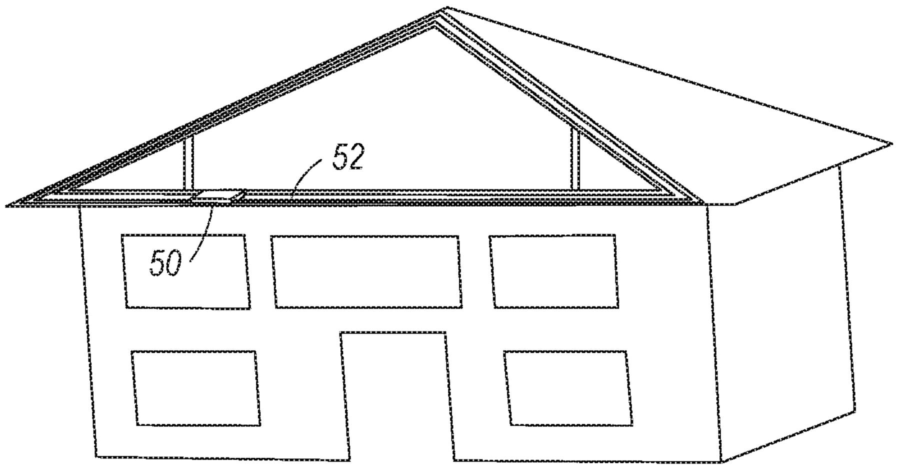
FIG. 1A shows a perspective diagram of an example of a portable support platform spanning between bottom chords of two parallel roof trusses, according to one or more embodiments.
Figure 1B:
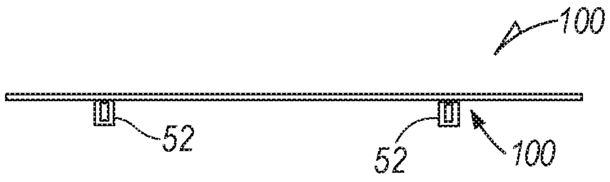
FIG. 1B shows a side view diagram of an example of the portable support platform spanning between bottom chords of two parallel roof joists, according to one or more embodiments.
Figure 2:
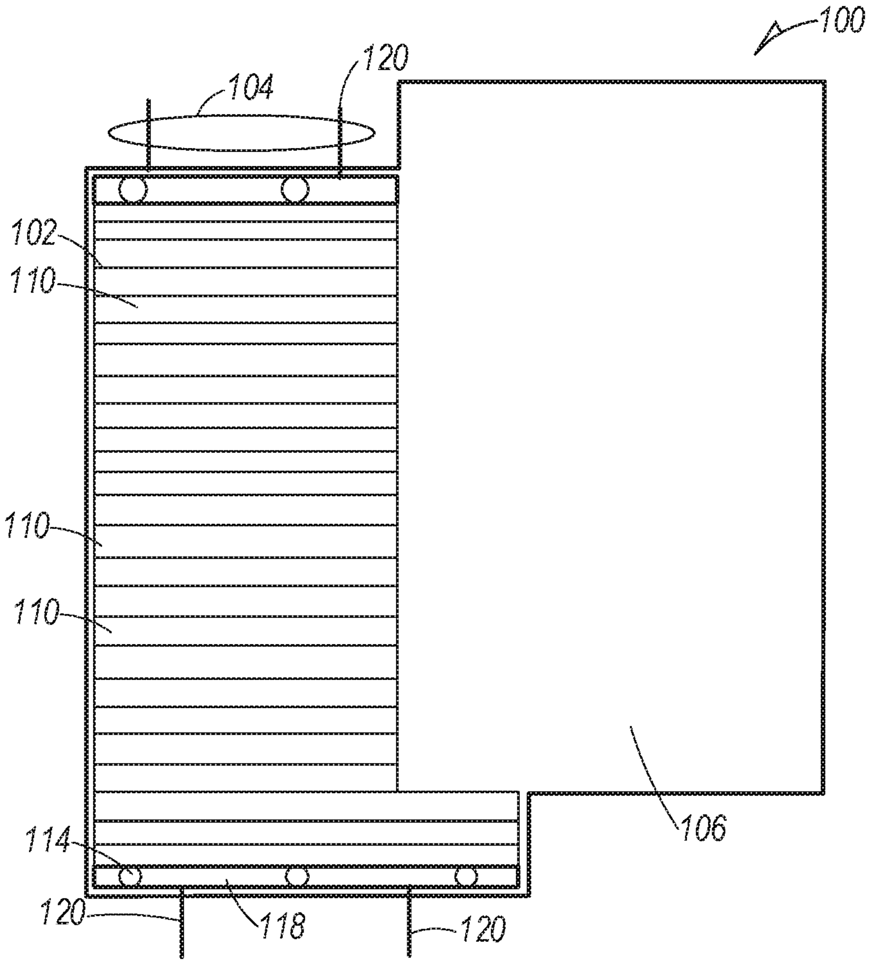
FIG. 2 shows a perspective, partially exploded, diagram of an example of the portable support platform, according to one or more embodiments.
Figure 3A:
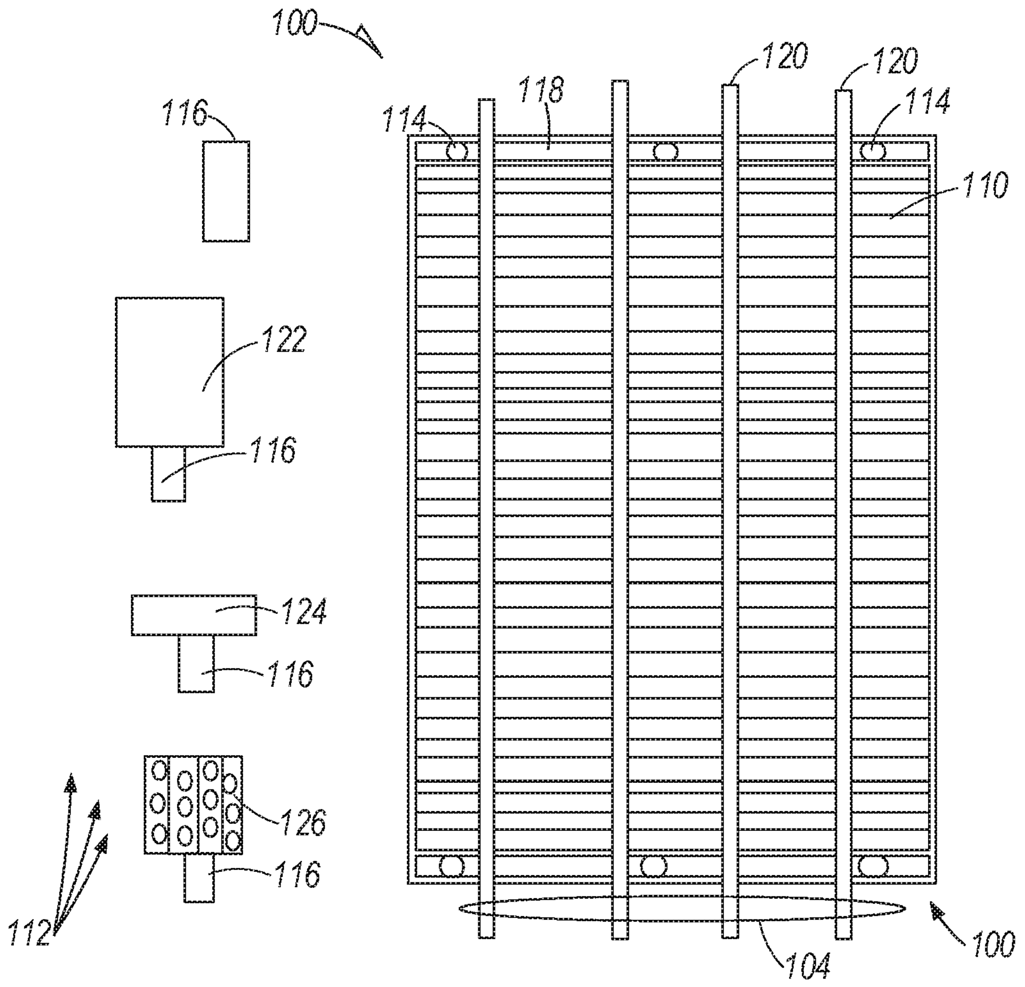
FIG. 3A shows a top view diagram of an example of the portable support platform, according to one or more embodiments.
Figure 3B:
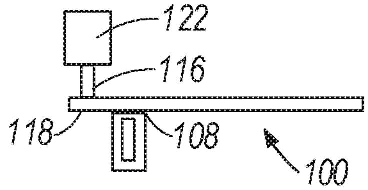
FIG. 3B shows a partial side view diagram of an example of the portable support platform with an accessory attached, according to one or more embodiments.

Referring to FIGS. 1A and 1B, an example of portable support platform 100 is shown. The portable support platform 100 is shown spanning a space 50 between bottom chords of two roof trusses 52. The portable support platform 100 may be able to support the weight of a user, allowing the user to kneel, move, and work in the space between two roof trusses 52. This benefits the user with a safer, much larger, and much more comfortable working area than the trusses 52 would otherwise provide. For example, when a worker is standing in an attic, the user may turn his/her toes outward in duck-footed fashion to allow their legs to extend generally upward, but their toes to pass below web members of the trusses and across the bottom chords of the trusses. While feasible, this stance is not always comfortable and risks foot slippage, which can cause a user to break through a ceiling and/or fall through a ceiling. More cumbersome is when a worker needs to kneel in an attic. Here the user must spread their knees wide enough to span between the bottom chords of trusses, which are commonly spaced 24 inches apart. Some workers may simply not have long enough upper legs to span that far and for others, the pressure point on the knee is painful. The portable support platform increases the available supporting surface and may also allow the user to more easily access otherwise difficult to reach areas.

Referring to FIGS. 1-5, various examples of the portable support platform 100 are shown. As suggested, the portable support platform 100 may be configured for collapsing for purposes of portability and may also be configured for providing structural support when it is in an expanded or open condition. The portable support platform may include a support portion 102, a tying or binding portion 104, and a cushioning feature 106. In one or more embodiments, a securing or stability feature 108 may be provided and/or one or a plurality of accessory systems 112 may also be provided. Each of these portions are discussed in more detail below.

The support portion 102 may be configured for supporting a user, worker, or other facility occupant when the portable support platform 100 is in an expanded condition. In one or more embodiments, the support portion 102 may be capable of providing support in the collapsed position as well. As such, the support portion 102 may include supporting features that, both, allow the platform to collapse and provide structural support. In one or more embodiments, the supporting features may include a plurality of spanning segments 110. The spanning segments 110 may be arranged to extend horizontally and, in use, extend across space 50 from one structural support element to another. When arranged generally adjacent to one another, the plurality of spanning segments 110 may create a platform or a mat for supporting a user. Together, the spanning segments may define an overall shape of the portable support platform 100. In one or more embodiments, the overall shape of the portable support platform 100 may be generally rectangular, but the portable support platform 100 may comprise a variety of overall shapes including square, trapezoidal, triangular, circular, and other shapes.

The segments 110 may be provided in a variety of physical forms, for example, the segments 110 may have cross-sectional shapes in the form of rectangles, cylinders, squares, tees, channels, tubes, other shapes, or a combination of shapes. For example, alternating shapes that may nest well when collapsed may be provided. The cross-sectional shapes may be hollow defining a lumen extending therethrough, or the cross-sectional shapes may be solid. The segments 110 may be arranged to extend generally parallel to one another in an expanded condition and may be closely arranged so as to contact adjacent segments or they may be slightly spaced apart.

The number of individual lateral segments 110, as well as the length, width, and thickness of each lateral segment 110 may be varied to achieve different overall dimensions of the portable support platform 100 for different purposes. Varying the dimensions and weight of portable support platform 100 may allow for optimizing the portable support platform 100 to suit different work environments or different purposes. The dimensions and weight of the lateral segments may be altered in accordance with the specific materials used. For example, the portable support platform 100, may have an overall width measured parallel to the segments 110 of 12-54 inches, 18-30 inches, or 20-28 inches. In one or more embodiments, the width may be 28 inches. The width may be selected to accommodate particular conditions and, for example, where trusses are spaced at approximately 24 inches on center, a width of 24-30 inches or 28 inches may be used. The overall length of the portable support platform, measured perpendicular to the segments 110, may range from 12-54 inches, 18-30 inches, or 20-28 inches. In one or more embodiments, the length may be 28 inches. That is, the number of lateral segments, their respective widths, and the spacing between the segments may define the length of the portable support platform. As such, the size of the platform may be selected by selecting a particular number of particularly sized and spaced segments 110. The general thickness of the platform may be established generally by the thickness of the segments and may range from 0.25-3 inches, 0.5-2 inches, or approximately ¾ inches. The individual segment widths may range from approximately 0.5 inches to approximately 4 inches, or approximately 1 inch to approximately 2 inches or a width of approximately 1.5 inches may be used. The segments 110 may be made from a variety of materials, for example, plastics, metals, or other composites. Plastic or composite lateral segments may need to be thicker than metal lateral segments in order to achieve the stiffness required to support a user's weight. In one or more embodiments, the combination of thicknesses and material choice may provide a bending moment capacity of approximately 1000 to 2000 in-lbs, or approximately 1250-1750 in-lbs, or approximately 1500 in-lbs per 6 inches of length of the platform. In one or more embodiments, steel may be used and a section modulus per 6 inches of length may range from approximately 0.015625 $in^3$ to approximately 0.25 $in^3$, or from approximately 0.3125 $in^3$ to approximately 0.1875 $in^3$, or approximately 0.0625 $in^3$ to approximately 0.125 $in^3$. Moreover, a moment of inertia per 6 inch of length of the platform may range from approximately 0.03125 $in^4$ to approximately 0.1875 $in^4$ or from approximately 0.0625 $in^4$ to approximately 0.125 $in^4$. Comparable section moduli for other materials may be used based on respective allowable bending stresses of other materials and comparable moments of inertia may be used based on respective moduli of elasticity of other materials. Still other ranges of section moduli and moments of inertia may be used based on the loading anticipated and the desired stress level and deflection. In one or more embodiments, aluminum may be used in lieu of steel, for example, and the above listed moments of inertia and section moduli may be increased to accommodate the lower strength material.

The segments 110 may be held in a parallel position with respect to each other by a tying or binding portion 104. The tying or binding portion 104 may be configured to connect the plurality of segments to one another while also allowing the segments to rotate relative to one another so as to allow for rolling collapse of the platform. In one or more embodiments, the tying or binding portion 104 may include one or a plurality of strips of substantially flexible material extending along the length of the platform (e.g., perpendicular to the segments). For example, one or more straps 120 may be attached to the segments 110. The straps 120 may be attached to the portable support platform in a variety of positions and may have a variety of lengths, as well as a variety of fasteners coupled to them. For example, the straps 120 may be attached to only to the outermost lateral segments or may extend and be attached along the entire length of the portable support platform 100. The straps may extend beyond the end of the platform surface such that when the portable support platform is in the collapsed orientation, the ends of the straps 120 may be coupled together to secure the portable support platform 100 in a rolled configuration. The ends of the straps 120 may be coupled together using a variety of fastening techniques such as hook and loop, buttons, snaps, buckles, or other fasteners. In other embodiments, the straps may be tied to one another to hold the collapsed position. In addition to or as alternative to straps 120, the tying or binding portion may span substantially the entire length and width of the portable support platform 100 and may be in the form of a sheet or layer, for example. The tying or binding portion may be coupled to a top or bottom surface of the segments 110 or the tying or binding portion may pass through the segments 110. That is, where, for example, the tying or binding portion is in the form of a rope, cable, or chain, the tying or binding portion may pass through the sidewall of each segment, through the segment, and out the other side of the segment. In still other embodiments, the tying or binding portion may be woven through and around the segments where is passes back and forth between the segments as it traverses the length of the platform. The binding portion 104 (e.g., straps, layer, cable, line, or other binding element) may be made from a variety of materials, for example, various fabrics, leathers, nylon, textiles, rubber, steel, wire, or other material. The binding portion 104 may help to prevent excess spacing between the segments 110 while also allowing the platform 100 to be flexible. As such, the portable support platform 100 may be rolled up or otherwise collapsed into a more compact orientation.

The portable support platform 100 may also include a cushioning feature 106. The cushioning feature 106 may be coupled to a top surface of the portable support platform 100 and may be configured to provide a more comfortable platform for the user to kneel or stand on. The cushioning feature may cover substantially a full top surface of the platform, or isolated strips or a pattern of cushioning may be provided. The cushioning feature 106 may be made from a variety of shock absorbing materials such as foam, rubber, or padded fabric. The cushioning feature 106 may be a single unitary layer or it may be segmented and coupled to each segment 110 separately. The cushioning feature 106 may be flexible and may avoid inhibiting the portable support platform from being rolled into a collapsed orientation. In one or more embodiments, the cushioning feature 106 may be used in conjunction with the binding portion 104 or may itself replace the binding portion 104 by being coupled to, and maintaining the spacing and orientation of the segments 110.

The portable support platform 100 may further include a securing or stability feature 108. The securing feature 108 may be arranged on a bottom surface of the portable support platform 100 and may be configured to resist and/or prevent sliding of the platform 100 relative to its supporting elements. The securing feature 108 may be arranged at a bottommost level of the portable support platform 100 such that the securing feature 108 may contact roof trusses 52 or other supporting elements. The securing feature may include a material adhered to a bottom side of the segments, for example. The material may include friction resisting materials such as rubber, foam, or textured materials such as grip tape or other biting materials. Still other materials and approaches to securing the platform 100 may be provided.

The portable support platform 100 may include one, or a plurality of, accessory systems 112. The accessory systems may be a two-part system having an accessory holder 114 on or near the platform and an accessory mount configured for engaging the accessory holder. The accessory systems 112 may be adapted to hold tools or other devices allowing the tools or devices to be readily accessible by the user of the platform.

The accessory holders 114 may include holes or slots in one, or a plurality, of the segments 110. Accessory holders 114 may be configured to engage with accessory mounts 116. For example, the accessory holders 114 may be sized, shaped, and arranged to receive the accessory mounts by having a same or similar shape and a same or slightly larger size than accessory mounts 116. In one or more embodiments, the accessory holders 114 may include a magnet or other securing feature for securing the accessory mounts 116. While noted and shown in or on the segments 110, the accessory holders 114 may be a part of the cushioning portion and/or the tying or binding portion.

The accessory mounts 116 may appear in a variety of physical forms, for example, the mounts may be shaped as cylindrical or rectangular posts, although a variety of other shapes are possible. The accessory mounts 116 may be shaped to correspondingly engage with the shape of the accessory holders 114. The accessory mounts 116 may engage with the accessory holders 114 with a slip fit connection, through friction, or using a coupling mechanism such as a spring detent, manual latch, magnet or other positive coupling mechanism.

The accessory mounts 116 may be coupled to various accessory holding elements or actual accessories. For example, accessory holding elements may allow for mounting, storage, or holding of the accessories on the portable support platform 100. For example, a tool rack, hook, or cup 122, may be provided to hold screw drivers, wrenches, wire nuts, pliers, and other hand tools, for example. In one or more embodiments, the tool cup 122 may be sized to accept different equipment or tools. For example, the tool cup 122 may be 4 inches wide and 5 inches tall, 3 inches and 4 inches tall, or 5 inches wide and 4 inches tall. Still other suitable dimensions for holding accessories may be provided. In one or more embodiments, actual accessories may include a magnet 124, an LED light 126, or other larger or more substantial tools that are coupled to the accessory mounts. Once an accessory holding element or actual accessory is mounted to an accessory mount 116, it can then be detachably mounted on the portable support platform 100 through the releasable engagement between the accessory holder 114 and the accessory mount 116.

In some examples, the portable support platform 100 may include one or two end segments 118. End segments 118 may have a greater surface area than the other segments 110. That is, the end segments may be generally larger to accommodate accessory holders 114 or for other reasons. In one or more embodiments, the end segments 118 may be 10%, 20%, 50%, 100%, or even 200% wider than the segments 110. The end segments 118 may be positioned as the two outermost, or first and last, segments of the platform 100.

Figure 4A:
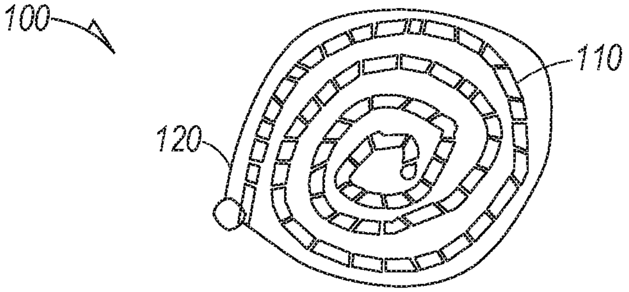
FIG. 4A shows a side view diagram of an example of the portable support platform in a collapsed condition, according to one or more embodiments.
Figure 4B:
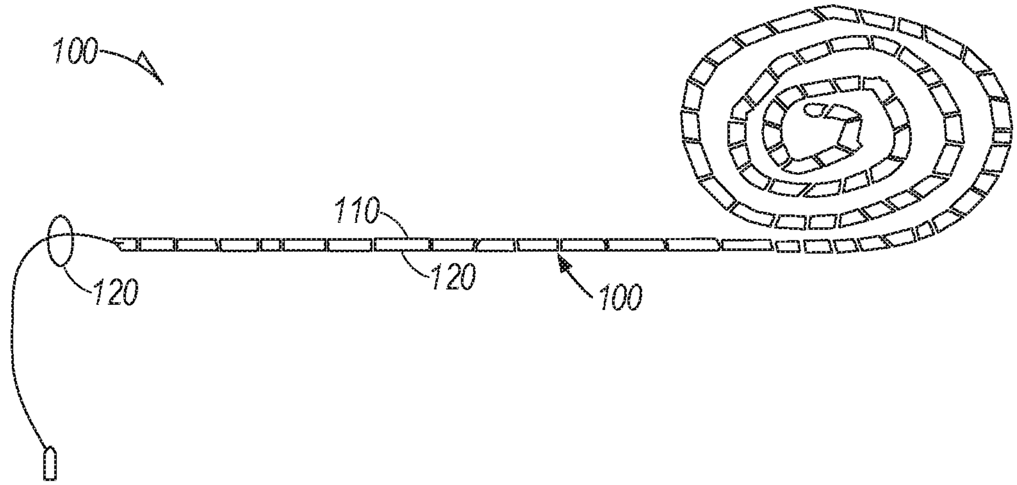
FIG. 4B shows a side view diagram of an example of the portable support platform in a partially collapsed condition, according to one or more embodiments.

An example of the portable support platform 100 in a fully collapsed orientation is shown in FIG. 4A. The flexible tying or binding portion 104, the cushioning feature 106, and/or the combination of the two allow the portable support platform 100 to easily articulate and roll up into a fully collapsed orientation. The straps 120 are shown extending completely around the collapsed platform 100 to hold it in a fully collapsed orientation. The portable support platform 100 may be transported and stored more easily in a fully collapsed orientation. An example of the portable support platform 100 in a partially collapsed orientation is shown in FIG. 4B.

Figure 5:
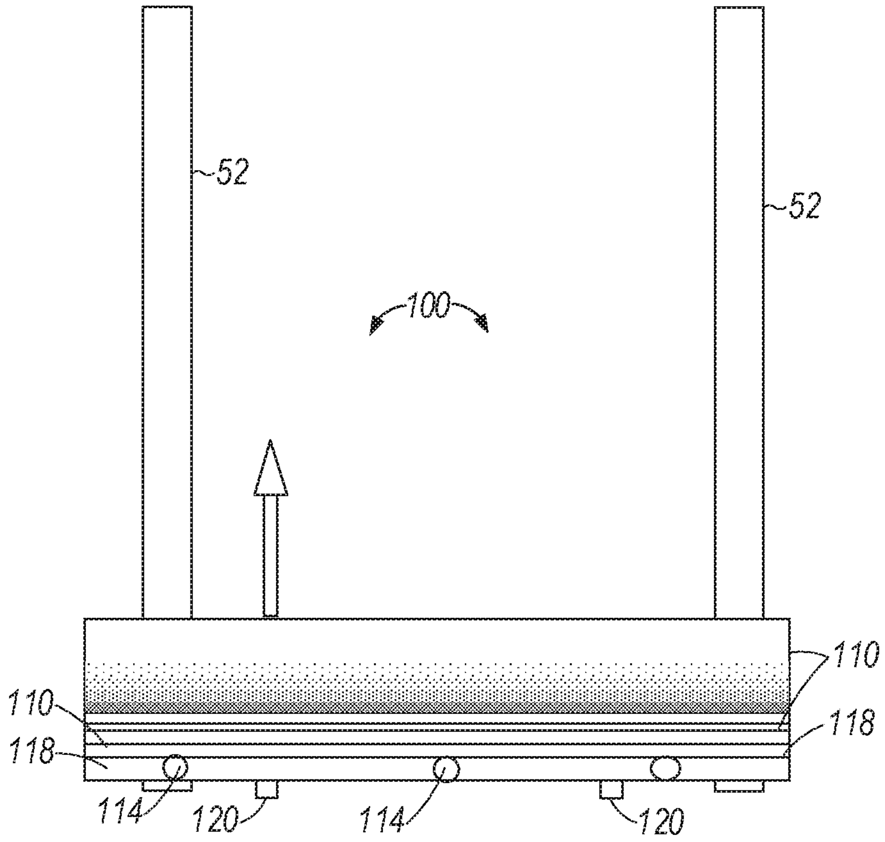
FIG. 5 shows a top view of an example of the portable support platform in place on a pair of bottom chords of a truss and in a partially collapsed condition, according to one or more embodiments.

Referring to FIG. 5, a top down view of the portable support platform 100 in the collapsed position is shown. As shown the portable support platform may be arranged on across supporting members 52 in the collapsed position. As shown by the arrow, the portable support platform may be unrolled along the supporting members 52 to deploy the platform 100 and place it in a supported condition by the members 52. The portable support platform 100 may be used to span various gaps and spaces a user may encounter during the construction or maintenance of a home or building. The portable support platform 100 is used in an expanded orientation and may be transported in a collapsed orientation. The portable support platform 100, when in a fully expanded orientation, creates a supported working area over the space between, for example, the bottom chords of two trusses 52. The portable support platform 100 can support a user's weight, such that a user is able to kneel and work over the spaces between trusses. As the tying and binding portion 104 maintains the position of the segments 110 whether the portable support platform is in an expanded or collapsed orientation, the segments 110 may naturally align themselves with respect to each other in both the collapsed and expanded condition.

Figure 6:
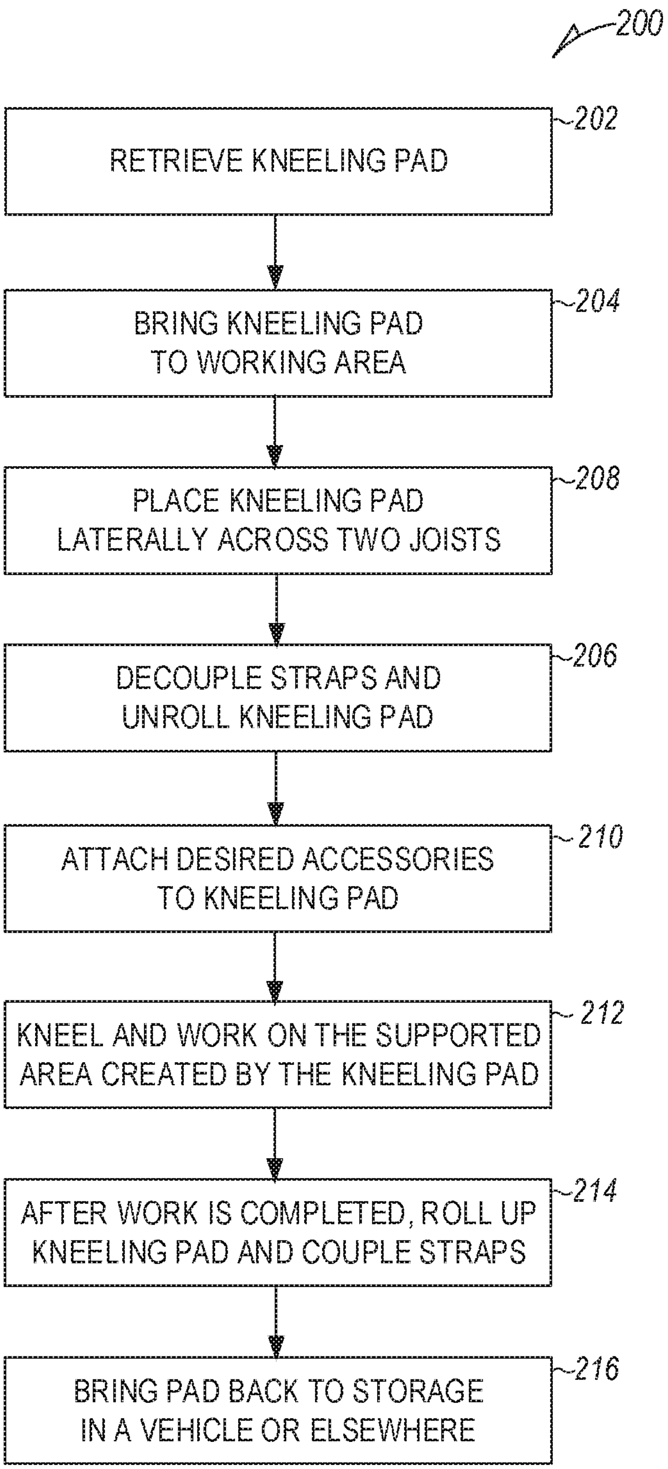
FIG. 6 shows a flow chart of an example of a method of use of the segmented portable support platform.

A method 200 of using portable support platform 100 may include several steps. An example of these steps of using the portable support platform 100 are shown in FIG. 6. In one or more embodiments, a user may retrieve the portable support platform 100 from a vehicle or other storage area (202). The user may transport and/or carry the portable support platform 100 to a desired working area (204) such as the attic of a residential home. The user may decouple the ends of straps 120 and unroll the portable support platform 100 into an expanded orientation (206). The user may place the portable support platform 100 across the bottom chords of two adjacent trusses 52 or other supporting features that may be present (208). In placing the platform, the segments 110 may be oriented to extend across and span the space between the trusses. A user may attach one or more accessories or accessory mounts 116 to the platform via one or more accessory holders 114 and based on the task to be carried out (210). For example, screws may be placed in a tool cup 122 for convenient retrieval or tools such as screw drivers may be removed from a tool belt, for example, and placed in an accessory holder 114. A user may begin working, using the portable support platform 100 as a supported working area spanning a space between bottom chords of the trusses 52 or other supporting features (212). A user may move the portable support platform to different working locations as needed. After work is complete or during a break in work, a user may remove accessories and accessory holders 114, roll up the portable support platform into a collapsed orientation, and couple the ends of straps 120 together (214). A user may also return the portable support platform 100 to a storage space, or place the portable support platform 100 into a vehicle for use at a subsequent work site (216).

Figure 7:
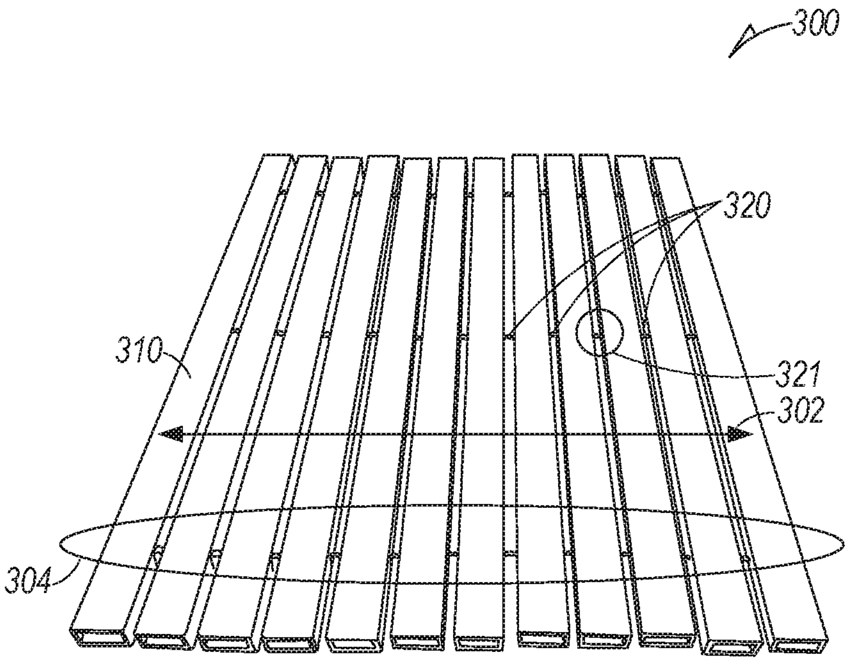
FIG. 7 is a perspective view of another embodiment of a portable support platform in an expanded condition, according to one or more embodiments.
Figure 8:
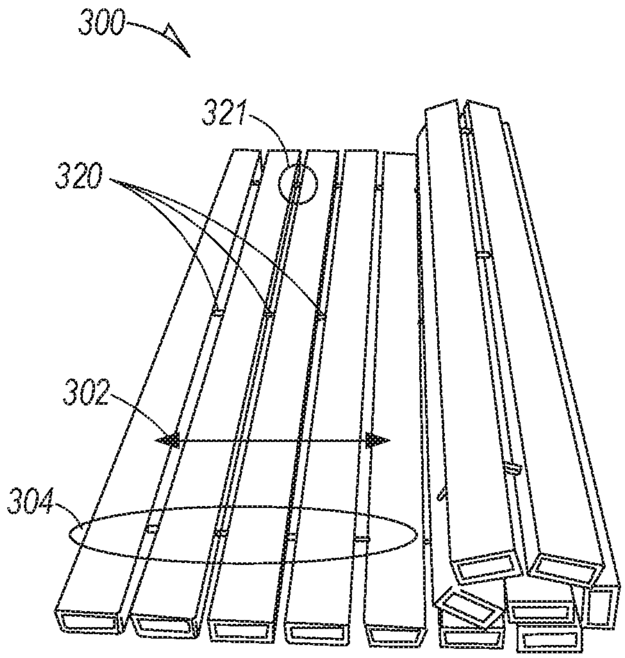
FIG. 8 is a perspective view of the portable support platform of FIG. 7 in a partially collapsed and partially expanded condition.

With reference to FIGS. 7 and 8, another embodiment of the portable support platform 300 is shown. As shown, the portable support platform 300 may be configured like the platform 100 such that it may be stored and carried in a collapsed condition and deployed to an expanded condition. As with the platform 100, the platform 300 may include a support portion 302, a tying or binding portion 304, and a cushioning feature. In one or more embodiments, a securing or stability feature may be provided and/or one or a plurality of accessory systems may also be provided. The cushioning feature, the securing or stability feature, and the accessory systems may be the same or similar to those described with respect to platform 100.

Regarding the support portion, a plurality of segments 310 may make up the support portion 302. In this particular embodiment, the segments 310 may take the form of rectangular tubular members having a rectangular and hollow cross section. In one or more embodiments, the tubes may be approximately 3 inches wide by 1% inches deep or 2% inches wide by 1 inch deep or 2 inches wide by % inch deep. The tubes may have a wall thickness ranging from approximately 1/32 inch to approximately 1/4 inch or from approximately 1/16 to approximately 7/32 inch, or from approximately 1/8 inch to approximately 3/16 inch. Still other thicknesses may be provided. In one or more embodiments, the tube material may be aluminum, steel, or another metal alloy or a composite material may be used. As with the segments 110, the segments 310 may have particular section moduli or moments of inertia suitable for supporting a user between spaced apart truss chords as discussed in more detail above.

The tying or binding portion 304 may function the same or similar to the tying portion 104 and may be configured to connect the plurality of segments to one another while also allowing the segments to rotate relative to one another so as to allow for rolling collapse of the platform 300. As shown, the tying or binding portion 304 may include a plurality of ties 320 that extend from one side of the platform to another in a direction generally perpendicular to the direction of the segments 310. That is, the ties 320 may extend generally transverse to the segments 310. In the embodiment shown, the ties may include a wire, cable, or rope that extends through the sidewalls of the segments 310, through the width of the segments 310, out the opposite side of the segments 310 and continues this across the width of the platform extending through each segment in the system. In one embodiment, the tie 320 may include air craft cable, for example, and may have a diameter ranging from approximately 0.015625 inches to approximately 0.25 inches or from approximately 0.03125 to approximately 0.09375, or a diameter of 0.0625 may be used. Still other diameters may be used. At each end, the ties 320 may be knotted or otherwise enlarged with a fanned out plate, rivet, washer, or other mechanism to prevent slippage of the end of the tie within the segments 310 and, as such, holding the several segments together. In one or more embodiments, the ties 320 may include bushings 321 arranged on the tie 320 and between each of the segments of the platform 300. The bushings may be cylindrically shaped elements arranged on the ties where the tie extends through a longitudinal lumen in the bushings. That is, the longitudinal axis of the cylindrical bushings may be arranged along and substantially parallel to the tie and the tie may be arranged on a longitudinal axis of the bushing. The bushing may have a diameter selected to receive the tie 320 and may have a length selected to establish a spacing between the segments 310. In one or more embodiments, the bushings may be aluminum, other metal, nylon or another material may be used.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

What is claimed is:

1. A method for using a portable support platform configured to span across a gap between two structural members, the portable support platform comprising:

a plurality of elongate hollow tubular members comprising:

a first end and a second end;

a flat uninterrupted bottom surface extending a full length of the respective elongate hollow tubular member from the first end to the second end, and a moment of inertia ranging from approximately 0.03125 $in^4$ to approximately 0.1875 $in^4$ per 6 inches of platform length measured perpendicular to the elongate hollow tubular members, and a tying portion comprising:

a plurality of flexible elements extending along the length of the portable support platform, perpendicular to, and through the plurality of elongate hollow tubular members and configured to allow for rolling collapse of the platform; and bushings arranged on the flexible elements between the respective elongate hollow tubular members configured to maintain a spacing between the elongate hollow tubular members, the method comprising:

deploying the portable support platform by unrolling the portable support platform;

placing the portable support platform on a top surface of the structural members comprising at least two bottom chords of structural trusses, the trusses being spaced 24 inches on center, and wherein placing the portable support platform comprises arranging the plurality of elongate hollow tubular members generally perpendicular to the at least two bottom chords; and bearing weight on the portable support platform to perform services in the space surrounding the portable support platform.

2. The method of claim 1, further comprising carrying the portable support platform in a collapsed condition to an attic space.

3. The method of claim 2, further comprising traversing the attic space to a work location with the portable support platform in the collapsed condition.

4. The method of claim 1, wherein placing is performed before deploying.

5. The method of claim 1, further comprising collapsing the portable support platform.

6. The method of claim 5, further comprising storing or stowing the portable support platform for later use.

7. The method of claim 1, wherein bearing weight comprises standing or kneeling on the portable support platform.

8. The method of claim 1, further comprising, placing an accessory mount on the portable support platform.

* * * * *